United States Patent [19]

Marson et al.

[11] Patent Number: 4,911,646

[45] Date of Patent: Mar. 27, 1990

[54] JACK SECURITY DEVICE

[75] Inventors: Albert U. Marson, Riverview; Joseph A. Marson, Allen Park, both of Mich.

[73] Assignee: Michigan Bell Telephone Company, Detroit, Mich.

[21] Appl. No.: 168,446

[22] Filed: Mar. 15, 1988

Related U.S. Application Data

[63] Continuation-in-part of Ser. No. 155,344, Feb. 11, 1988, Pat. No. 4,846,708.

[51] Int. Cl.$^4$ .......................................... H01R 13/447
[52] U.S. Cl. .................................... 439/133; 439/144; 439/373
[58] Field of Search ............... 439/133, 135, 136, 144, 439/147, 373; 379/445, 438, 439; 174/66, 67; 70/163, 167, 168, 169; 292/148, 281

[56] References Cited

U.S. PATENT DOCUMENTS

| | | | |
|---|---|---|---|
| 1,878,436 | 9/1932 | Burroughs | 70/168 |
| 1,950,205 | 3/1934 | Young | 411/508 |
| 2,288,241 | 6/1942 | Holcomb | 439/133 |
| 2,563,094 | 8/1951 | Becker | 232/24 |
| 2,864,906 | 12/1958 | Medenbach | 379/445 |
| 2,955,272 | 10/1960 | Gallardo | 439/134 |
| 2,978,613 | 4/1961 | Hein | 439/133 |
| 2,987,909 | 6/1961 | Shlank | 70/168 |
| 3,031,875 | 5/1962 | Brown | 70/168 |
| 3,293,588 | 12/1966 | Blonder | 439/133 |
| 3,363,216 | 1/1968 | Benedetto | 439/147 |
| 3,428,936 | 2/1969 | Arnao, Jr. | 439/144 |
| 3,693,494 | 9/1972 | Meyer | 411/508 |
| 3,749,815 | 7/1973 | Boatwright et al. | 439/142 |
| 3,794,278 | 2/1974 | Frey, Jr. et al. | 248/27.3 |
| 3,811,104 | 5/1974 | Caldwell | 439/135 |
| 3,972,579 | 8/1976 | Kohaut | 439/131 |
| 4,093,331 | 6/1978 | Molchan | 439/144 |
| 4,311,883 | 1/1982 | Kidney | 439/133 |
| 4,473,265 | 9/1984 | Dellinger et al. | 439/147 |
| 4,479,688 | 10/1984 | Jennings | 439/133 |
| 4,494,809 | 1/1985 | Soloman | 439/369 |
| 4,575,169 | 3/1986 | Duplatre et al. | 439/142 |
| 4,581,907 | 4/1986 | Eberly | 292/281 |
| 4,584,856 | 4/1986 | Petersdorff et al. | 439/133 |
| 4,607,900 | 8/1986 | Andrews et al. | 439/142 |
| 4,645,284 | 2/1987 | Duplatre et al. | 439/142 |
| 4,740,168 | 4/1988 | Carney et al. | 439/133 |
| 4,749,359 | 6/1988 | White | 379/438 |

Primary Examiner—Neil Abrams

[57] ABSTRACT

A jack security device, especially suitable for standard telephone jacks mounted at a panel of an access cabinet, can either prevent unauthorized access to a secured empty jack or prevent removal of a plug from a jack in use. An end portion of the device partially covers the plug receiving jack opening. The main body of the device carries a key-actuated tumbler and slides into an access cabinet housing recess adjacent to the jack. A locking tab carried by an inner end of the tumbler engages a surface provided in the housing to place the device in a locked condition with the flanged end portion partially covering the secure jack. Additionally, arrangements within the access cabinet are provided for overriding a locked condition of the device without the need for a lock actuating key.

10 Claims, 12 Drawing Sheets

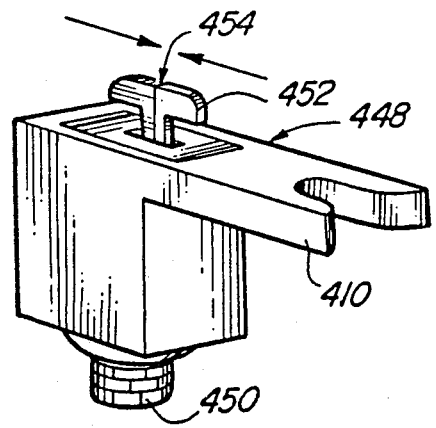
_Fig-17_
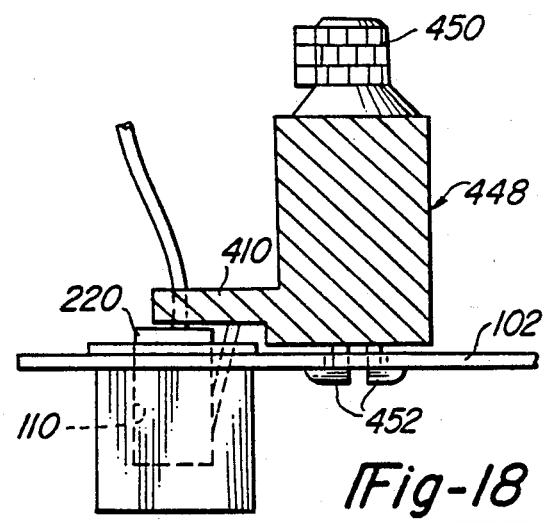
_Fig-18_
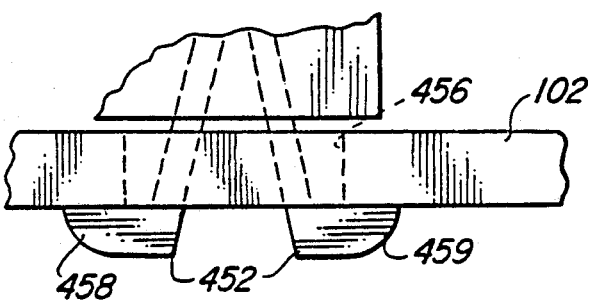
_Fig-19_
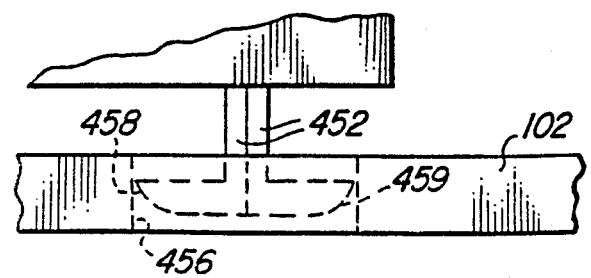
_Fig-20_

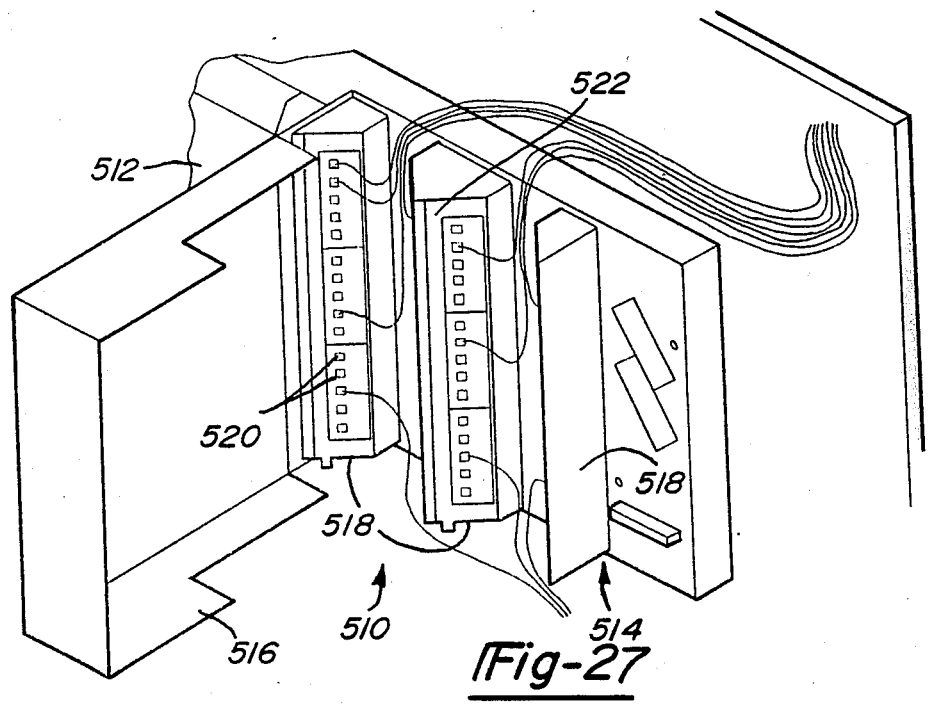
Fig-27
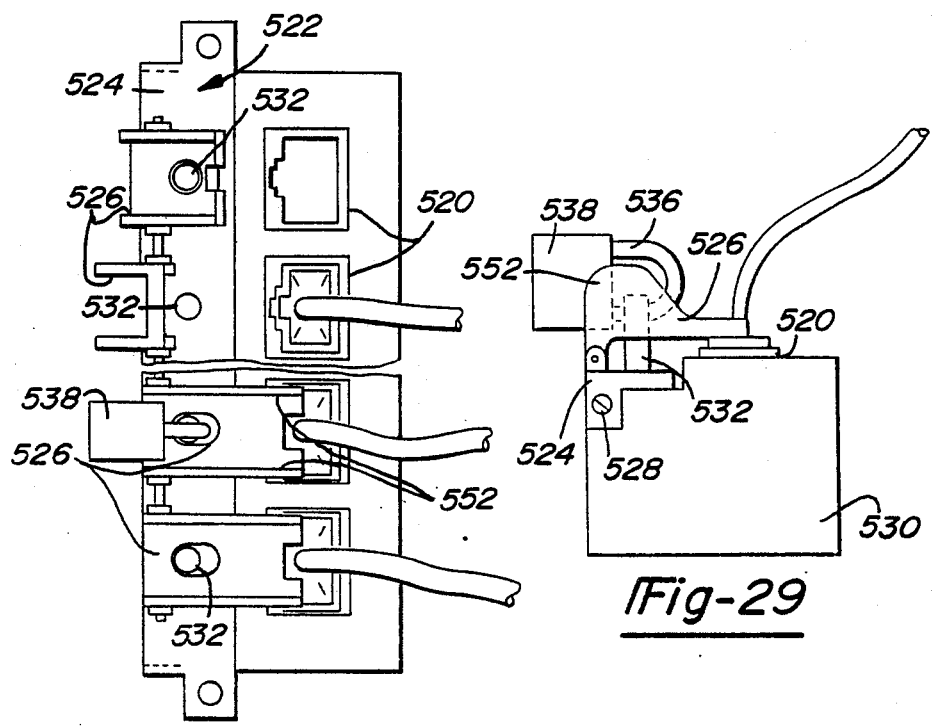
Fig-28
Fig-29

JACK SECURITY DEVICE

CROSS REFERENCE TO RELATED APPLICATIONS

This is a continuation-in-part of application Ser. No. 155,344 filed Feb. 11, 1988 now U.S. Pat. No. 4,846,708 entitled "Jack Security Device".

BACKGROUND OF THE INVENTION

The invention relates generally to devices which prevent tampering with cable connectors. More specifically, the invention concerns a security device for preventing unauthorized insertion or removal of a plug from a mating jack, while still enabling an authorized entity to override the prevention mechanism.

As the result of recent changes in the telephone industry, post telecommunications subscribers no longer rent their telecommunications equipment from their local telephone company. Instead, they either own their own telephones, PBX's or other equipment customarily installed on the subscriber's premises, or they lease such equipment from telecommunication companies. With the advent of subscriber-owned equipment, especially in the office building, apartment, or dormitory environment, a need has arisen for enabling the telephone or communications concern to conveniently obtain access to the subscriber-owned equipment with a network interface at a centralized location on the subscriber premises.

However, such centralization along with modularization of components enabling their interconnection via standardized plug-ended cords and mating jack receptacles, poses a problem at the centralized access point. The subscribers must have access to the plug receiving jacks, yet must be able to prevent unauthorized tampering with the desired arrangements of the equipment at the telephone or communication concern's jack-ended interface. This problem is especially aggravated where more than one subscriber entity may be resident in the same building served by a common telephone company access interface point. In this situation, a security system would appear highly beneficial in preventing one group of subscribers from interfering with or tampering with the arrangements at the interface of another group of subscribers. In addition, it is necessary for authorized personnel from the telephone company or the communications concern to have access to all jacks and connectors.

SUMMARY OF THE INVENTION

It is an object of this invention to provide a jack security device and system especially tailored for use in a communications interface environment using standard plug-ended equipment cords mating with a standard jack.

In accordance with the invention, a security device for preventing the insertion or removal of a plug into or from a jack opening at a first side of a wall includes a main device body portion shaped for sliding receipt in a recess of the jack mounting wall located adjacent to the jack opening. A tongue portion extends from the main body portion and covers a portion of the jack opening whenever the main body portion is inserted into the adjacent wall recess. The security device further includes an opening in the tongue portion suitably positioned and dimensioned for allowing passage of a cable connected to the plug to pass therethrough. Locking apparatus carried by the main body portion and having a movable element protruding therefrom is configured in a locking position so as to engage a latching surface associated with an inner side of the wall.

It is a feature of this invention that the locked condition of the jack securing device may be overridden without the necessity of an unlocking device by separate means accessible only to an authorized party, such as the telephone or communications company.

BRIEF DESCRIPTION OF THE DRAWINGS

These and other objects and features of the invention will become apparent from a reading of a detailed description taken in conjunction with the drawing, in which:

FIG. 17 is a perspective view of the jack security device of yet another embodiment of the invention;

FIG. 18 is a cross-sectional view of the embodiment of FIG. 17, illustrating the jack security device in the installed position;

FIGS. 19 and 20 are detailed cross-sectional view illustrating the operation of the override feature of the jack security device of the embodiment of FIGS. 17 and 18;

FIG. 27 is a perspective view of the presently preferred cabinet in which the jack security device may be used; FIG. 28 is a fragmentary plan view of yet another embodiment of the invention for use with padlocks;

FIG. 29 is a side view of the embodiment of FIG. 28, illustrating the manner in which a padlock is installed;

DETAILED DESCRIPTION

Figure 1A:
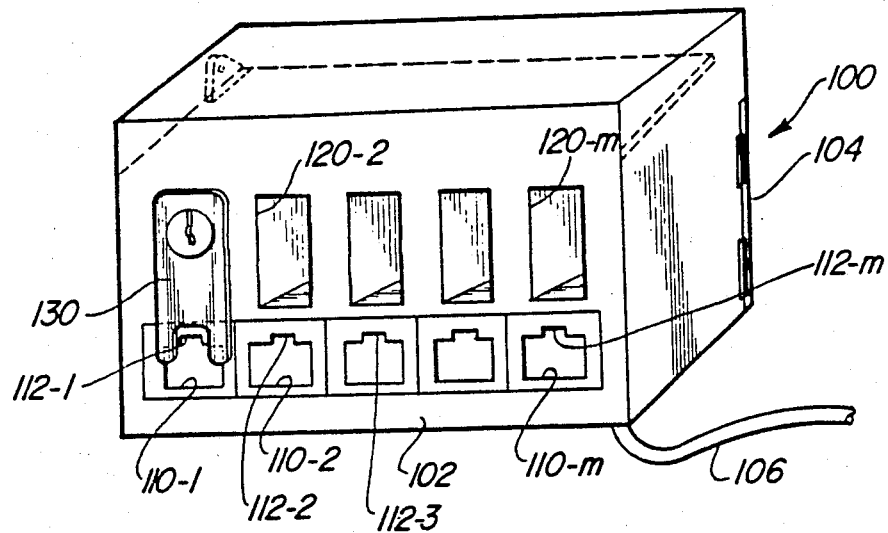
FIG. 1A is a perspective view of an access cabinet having an array of jacks and associated recesses arranged for use with a security system designed in accordance with the principles of the invention.

With reference to FIG. 1A, a first embodiment of the invention is illustrated. In FIG. 1A an access cabinet 100 is shown having a plurality of jack positions 110-1 through 110-m opening at a front wall 102. Adjacent to each jack opening is a corresponding recess 120-1 through 120-m shaped for sliding receipt of a jack security device 130, one of which is shown in recess 120-1 of FIG. 1A. The jacks and mating plugs may be of the RJ11 type in common use throughout the telephone industry. As is well known in the art, each RJ11 type jack includes a cut out portion at a perimeter of the jack opening, shown as 112-1 through 112-m in FIG. 1A, which receives a flexible locking tab element protruding from the typical RJ11 plug. The locking tab element is designated by numeral 221 in FIG. 1A. Although positions for five jacks and associated security devices are shown, it will be understood that m could be any suitable number. Shoulders on the flexible locking tab engage the areas on either side of areas 112 to lock the plug in its mated position within the jack. A plug is removed from its RJ11 type jack by manually depressing the spring loaded locking tab downwardly in FIG. 1A from the recess 112 to enable the extraction of the plug from the jack.

Figure 1B:
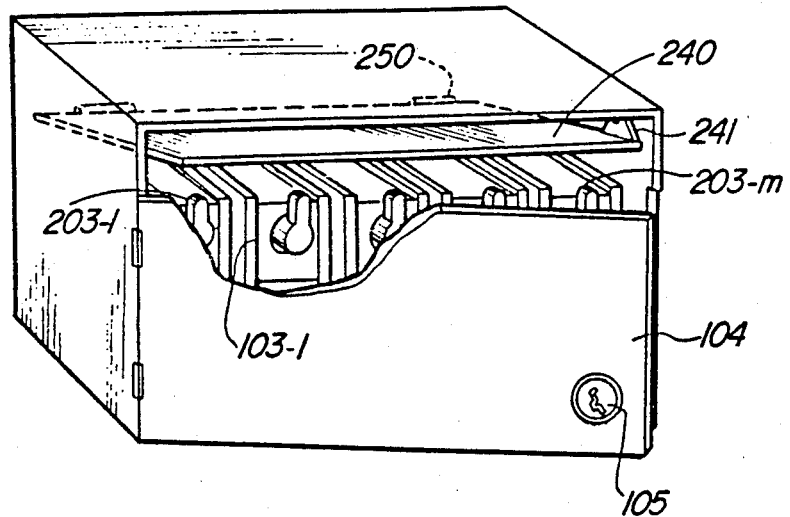
FIG. 1B is a perspective view of the access cabinet of FIG. 1A taken from the rear of the cabinet.

As seen from FIG. 1B, access cabinet 100 additionally includes a rear door 104 which may be locked in any of a number of known ways, such as with a key or combination lock, the keyhole 105 being shown in FIG. 1B. Typically, access to the cabinet via rear door 104 would only be effected by telephone company or communication concern personnel responsible for interfacing the company's equipment to subscriber-owned apparatus designed for plug-ended termination at the access cabinet via jacks 110. In FIG. 1A, cable 106 coming from the communications or telephone network is shown entering a bottom surface of cabinet 100 at a suitable sealed port, not shown.

It is also to be understood that the principles of the invention apply equally well to openings in a wall, the other side of which would be accessible only by authorized telephone company personnel. For example, a separate locked room could be available for telephone company equipment, one wall of which would be available for subscriber access at its other side via jacks 110.

Figure 2A:
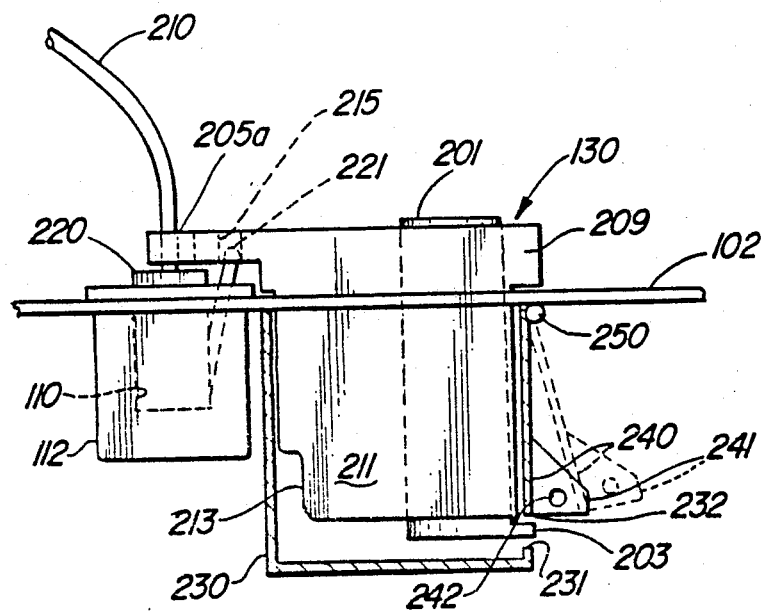
FIG. 2A is a side cross-sectional view of one of the jack positions of the cabinet of FIG. 1A with a security device shown inserted into an associated recess.
Figure 2B:
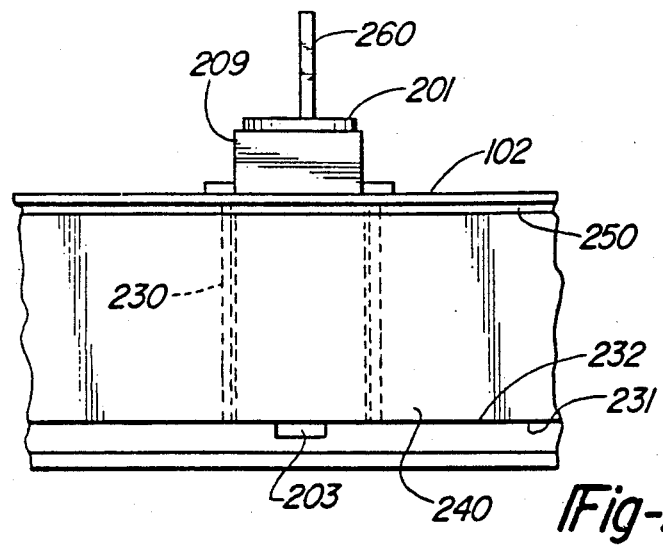
FIG. 2B is an end view of the apparatus of FIG. 2A.
Figure 3:
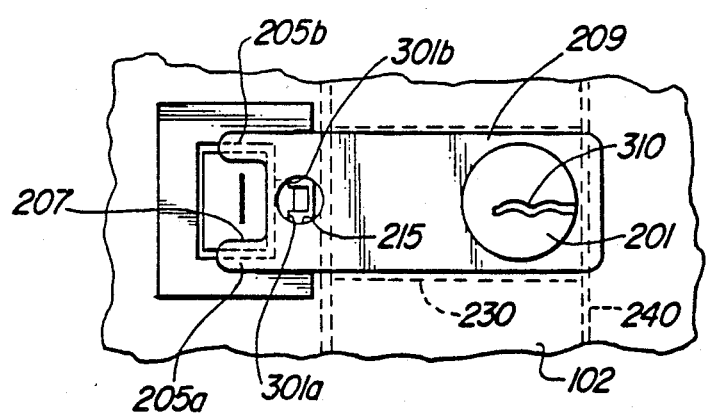
FIG. 3 is a top view view of the apparatus of FIG. 2A.
Figure 4:
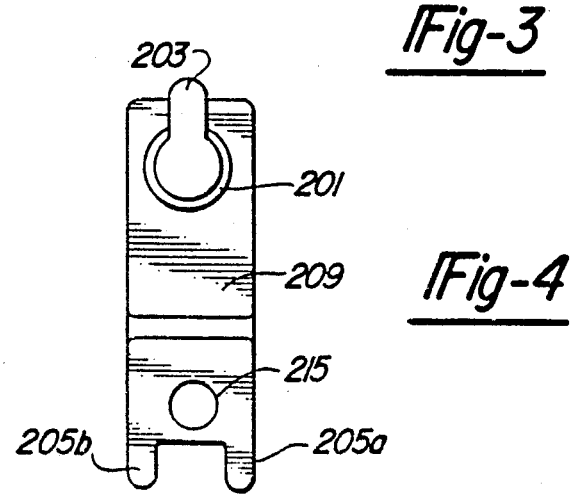
FIG. 4 is a bottom view of the security device shown in FIG. 2A.

Further details of the jack security device and its arrangement with the jack mounting wall may be explained in conjunction with reference to FIGS. 1B, 2A, 2B, 3 and 4. Jack security device 130 includes a top flanged portion 209 and a main body portion 211 resting in a recess in the wall 102 of cabinet 100 defined by internal housing walls 230 and a recess wall 240. Journaled for rotation in main body portion 211 is a tumbler mechanism 201 which, as shown in FIG. 3 includes a keyhole 310 facing outwardly of the panel wall 102. Therefore, the tumbler 201 is rotatable only upon the insertion of a mating key into keyway 310. In the alternative, a combination lock or other suitable locking mechanism may be used. As seen from FIGS. 2A and 3, the recess for holding the main body portion of the security device is positioned adjacent to the jack opening 110 of connector 112 at the wall 102 such that a tongue portion comprising members 205a and 205b partially cover the jack position on the wall whether or not a plug is resident therein. It will be noted that the view of FIG. 2A shows a plug 220 matingly engaging the socket of the jack, while the view of FIG. 3 shows the apparatus without the presence of a plug for clarity.

The tongue portion of security device 130 also includes an opening 215 positioned to capture an end portion of flexible plug locking tab 221. As seen from FIG. 3, plug locking tab 221 will, via conventional shoulders, engage areas 301a and 301b of the jack opening to hold the plug in the socket unless the locking tab is pushed inwardly of the jack socket perimeter. Hence with the security device 130 shown in place over a plug, access to the unlocking tab 221 is prevented. Even in the absence of a plug, protruding portions 205a and 205b of the tongue area of the security device are dimensioned such that a sufficient area of the jack opening is covered, thereby preventing unauthorized insertion of plug-ended equipment into the jack receptacle. Additionally, the protruding elements 205a and 205b are simultaneously configured such that they will overlie a plug 220 inserted into the jack receptacle 110 in a manner preventing its extraction even in the absence of a flexible locking tab 221. The portions 205a and 205b define a three sided opening or slot 207 through which a plug wire 210 connected to the plug may pass.

At the end of the tumbler mechanism 201 housed in the recess of wall 102, a latching or locking tab 203 protrudes from the tumbler into a receiving slot 231 separating housing wall 230 from recess wall 240. Hence, in a locked condition (as shown in FIG. 2A) upon attempted withdrawal of jack security device 130 from the recess, locking tab 203 will engage a latching portion 232 of recess wall 240 thereby preventing the extraction of the security device.

Although the security device is placed in its locked position, the invention contemplates arrangements for enabling authorized personnel, such as telephone company technicians, to override the locked condition and remove the security device 130 without the necessity for inserting an appropriate key 260 into keyway 310 and rotating the locking tab 203 out of engagement with the latching portion 232 of recess wall 240.

A first approach to providing such overriding capability is set forth in FIG. 1B and FIG. 2A where it is seen that the recess wall 240 is hinged at 250 such that wall 240 may be pivotally swung away from the main body portion of the security device 211 as shown in dashed lines at the phantom position of wall 240 in FIG. 2A. Such pivotal action of wall 240 would be effected only by authorized personnel having access to the interior of the cabinet 100 through the rear.

Additionally, as seen from FIG. 1B, wall 440 may be shared by a plurality of jack security devices, any of which may be removed upon appropriate movement of wall 240 away from the body portions 211. Wall 240 is also provided with at least one tab element 241 for securing wall 240 in its non-overriding position via. For example, a screw passing through opening 242 and threadedly engaging a hole in an interior surface of cabinet 100 or a separate padlock (not shown) could serve this function.

As further seen from FIG. 2A, the main body portion 211 of jack security device 130 includes an undercut as at 213. Undercut 213 enables an arrangement wherein the degree of pivotal separation of recess wall 240 may be limited due to the presence of other adjacent equipment within the cabinet. The dimension from the lower surface upward of the undercut portion 213 is sized such that the jack security device 130 is raised outwardly of the recess until the locking tab 203 again engages the swung out wall 240 shown in phantom dashed lines. Then the body of the security device 130 may be shifted toward the left as viewed from FIG. 2A thereby again providing clearance between locking tab 203 and the wall 240 such that the jack security device 130 may be completely extracted from the recess in wall 102.

Figure 9:
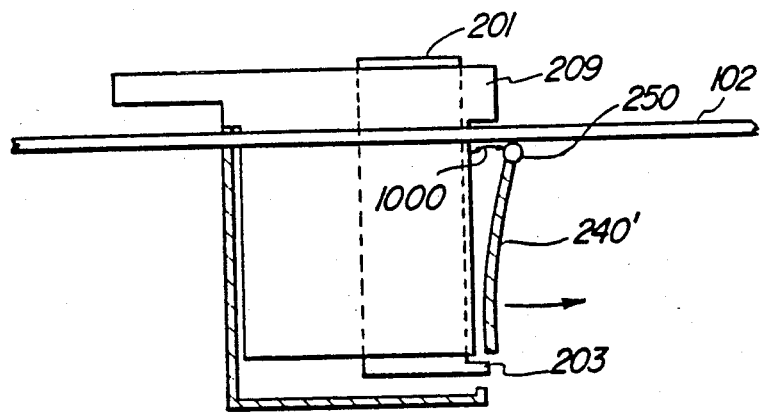
FIG. 9 is a first alternative arrangement of the hinged wall 240 of FIGS. 2A and 2B.
Figure 10:
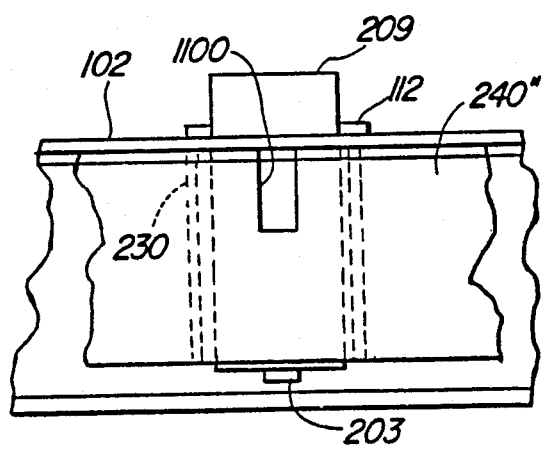
FIG. 10 is a second alternative arrangement of the hinged wall 240 of FIGS. 2A and 2B.

FIGS. 9 and 10 set forth alternative arrangements for wall 240 of FIGS. 1B, 2A and 2B which will avoid the need for providing undercut 213 (FIG. 2A) in main body portion 211 of jack security device 130.

As seen from FIG. 9, hinged wall 240', unlike its counterpart 240 in FIG. 2A, has its hinge element 250 spaced a distance shown as 1000. Wall 240' is curved or otherwise shaped such that is lower portion will provide a locking surface for locking tab 203. Dimension 1000 is chosen such that whenever wall 240' is swung outwardly of body 211, security device 130 may be extracted from its socket with little or no tilting or shifting required, since the upper portion of wall 240' is coupled to hinge 250 at a point providing clearance for locking tab 203. If it is desired to remove device 130 with no shifting or tilting, it may be necessary to form a notched opening in panel 102 immediately above locking tab 203.

In FIG. 10, the need for an undercut is avoided by providing an opening 1100 in the top portion of wall 240" (one opening of course being provide for each security device being served by wall 240"). Opening 1100 is positioned and sized such that a clearance is provided for locking tab 203 when wall 240' is swung away from body portion 211 and a jack security device 130 is pulled straight out of its receiving cavity in cabinet 100.

Figure 5A:
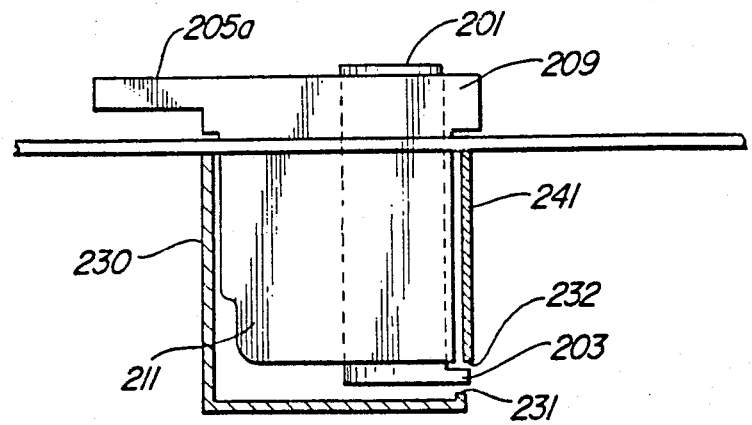
FIG. 5A is a side view of a first alternative approach to providing locking override.
Figure 5B:
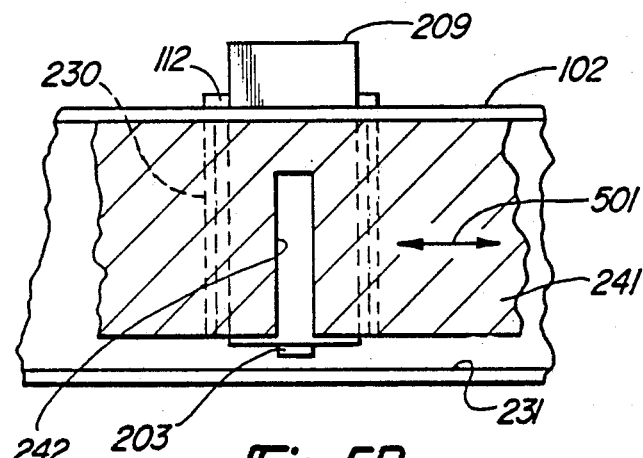
FIG. 5B is a view taken normal to the latch bar 241 of FIG. 5A.

A first alternative lock override or bypass arrangement is set forth in FIGS. 5A and 5B. In the arrangement of FIGS. 5A and 5B, the hinged recess wall of FIG. 2A is replaced by a sliding latch bar 241. Latch bar 241 slides in the directions of the arrow 501 of FIG. 5B and is provided with a slot 242 in the latch bar which, when the security device is in its locked condition, is displaced from locking tab 203 such that tab 203 can engage the undersurface edge 232 of sliding latch bar 241. When override is desired, the latch bar 241 is slid for example to the left in FIG. 5B such that slot 242 directly overlies locking tab 203. Under this condition, the main body portion 211 of the security device may be raised upwardly in the recess by the locking tab 203 riding up the slot 242.

Figure 6:
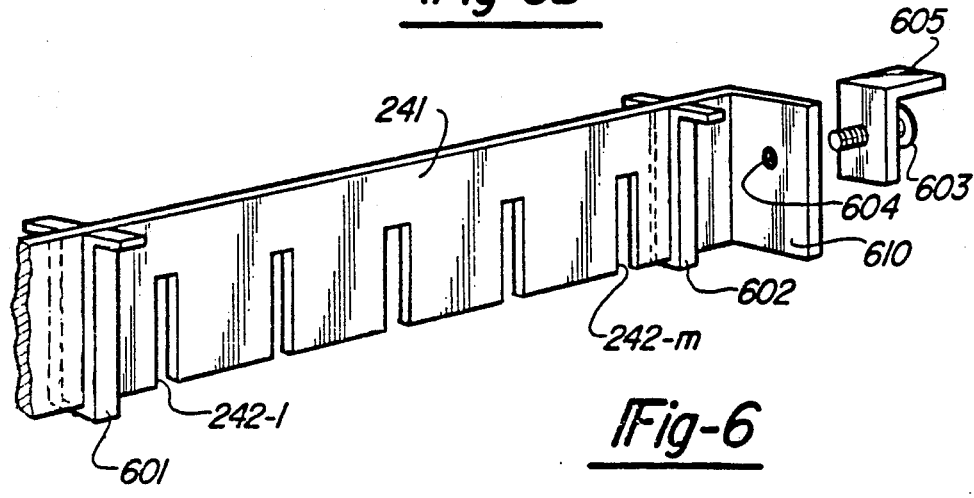
FIG. 6 is a perspective view of sliding latch bar 241 of FIG. 5B.

As with the approach set forth with reference to FIG. 2A, the overriding apparatus of FIGS. 5A and 5B may be arranged such that a single element enables the substantially simultaneous override of a plurality of jack security devices housed in recesses appropriately aligned in wall 102 of panel 100. For example, as seen in FIG. 6, sliding latch bar 241 may have a plurality of slots 242-1 through 242-m, each associated with a separate jack security device and its corresponding locking tab element. The latch bar 241 would be mounted via brackets 601 and 602 to appropriately positioned internal surfaces of the cabinet and could be bolted into a non-overriding position through use of a retaining bracket 605 coupled to a flanged end 610 of latch bar 241 via retaining screw 603 engaging threaded hole 604 in flange 610.

Figure 7A:
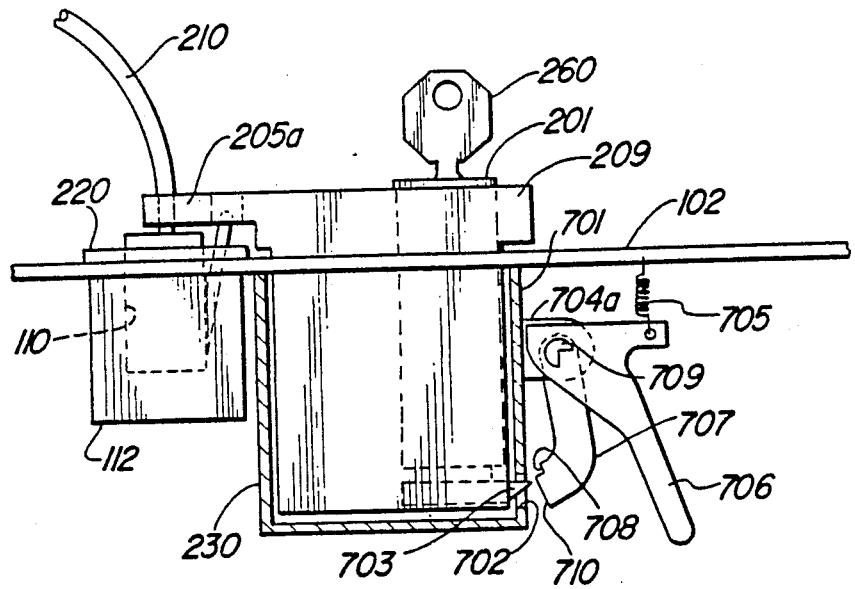
FIG. 7A is a side view of a second alternative approach to providing locking override.
Figure 7B:
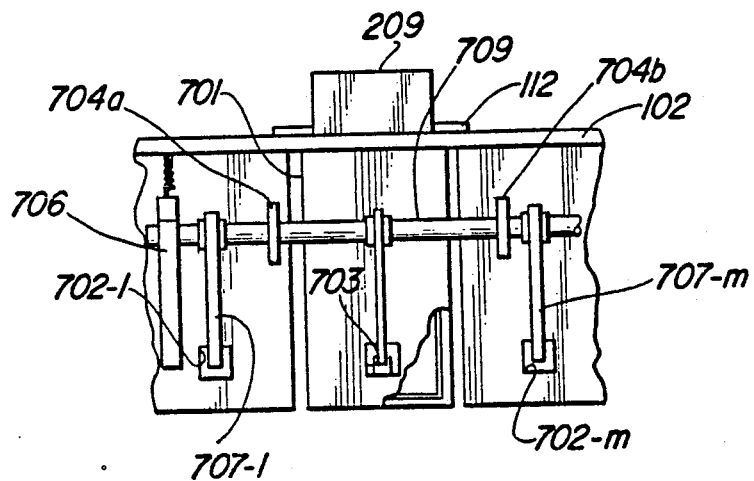
FIG. 7B is a view taken normal to the fixed wall 701 of FIG. 7A.

A second alternative arrangement for providing the override feature may be explained with reference to FIGS. 7A and 7B. In the arrangement of FIGS. 7A and 7B, the tumbler mechanism 201 is provide at its internal end with a spring loaded locking tab 703 or a conventional spring loaded striker mechanism associated with a lock tumbler. Striker 703 would, under subscriber control, be retracted from aperture 702 in fixed wall 701 via turning of key 260. To override the locked condition via access to the other side of wall 102 in the cabinet 100, the technician could inwardly depress the striker 703 using, if necessary, a suitable tool such as a screw driver while simultaneously urging the security device outwardly of the recess.

As with the previously discussed override arrangements, that shown in FIGS. 7A and 7B may also be used to simultaneously serve plurality of jack security devices. To provide for simultaneous depression of a plurality of strikers 703, a like plurality of release tabs 707 abut strikers 703 at bearing protrusions 710. The release tabs 707-1 through 707 m are coupled to an override assembly shaft 709 which is, in turn, mounted to wall 701 via shaft retainers 704a and 704b. Additionally coupled to shaft 709 is a release lever 706 which is also coupled to cabinet wall 102 via a return spring 705.

Figure 8:
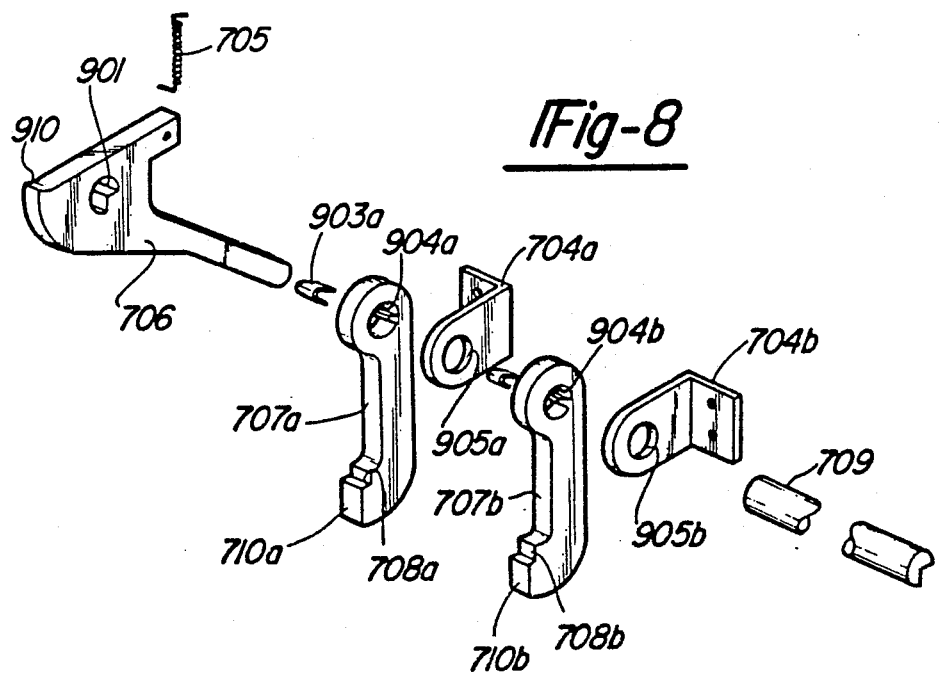
FIG. 8 is an exploded perspective view of the lock override apparatus of FIGS. 7A and 7B.

The override elements are shown in an exploded perspective view in FIG. 8, where two release tabs 707a and 707b are depicted. Assembly shaft 709 includes a longitudinally extending notch of about one fourth the circular area of a cross section of the shaft. Shaft 709 is mounted to wall 701 by passing through holes 905a and 905b of shaft retainers 704a and 704b, respectively. Shaft 709 is additionally coupled to release tabs 707a and 707b by passing through openings 904a and 904b in conjunction with release tab springs 903a and 903b. Finally, shaft 709 is coupled to release lever 706 by passing through a mating $\frac{3}{4}$ circular hole 901 in lever 706. Lever 706 additionally includes hole 902 for retaining receipt of one end of return spring 705.

With reference to FIGS. 7A and 7B, authorized personnel would access the mounting cabinet and override the locked jack security devices by depressing lever 706 toward wall 701 to rotate shaft 709. Rotation of shaft 709 applies force on release tab 707 to rotate the release tab in the same direction. Protrusion 710 on release tab 707 is not as large as the longitudinal one-quarter area notch in assembly shaft 709, thereby allowing release tab 707 to rotate approximately 75 degrees. Release tab spring 903 holds the release tab in the start, or non-overriding position. Hence, the lever 706 may be used to simultaneously operate all release tabs coupled to shaft 709. Alternatively, individual tabs 707 may be rotated to release only a preselected locked jack security device. Return spring 705 returns all release tabs to the non-override position, while return stop 910 on lever 706 stops the entire assembly in the proper starting position. Tab stop 708 allows the protrusion 710 of release tab 707 to enter aperture 702 to an extent slightly greater than the thickness of wall 701 to depress striker 703 a distance enabling withdrawal of the jack security device. Wall 701 is shown in FIG. 7B as having separate sections for each jack security device. It will, of course, be appreciated that, alternatively, wall 701 could take the form of a unitary piece serving all on security devices.

Figure 11:
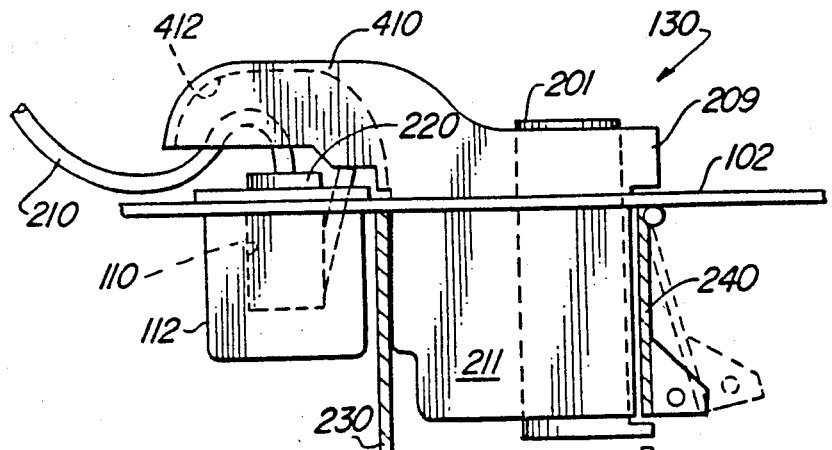
FIG. 11 is a side cross-sectional view of another embodiment of the invention.
Figure 12:
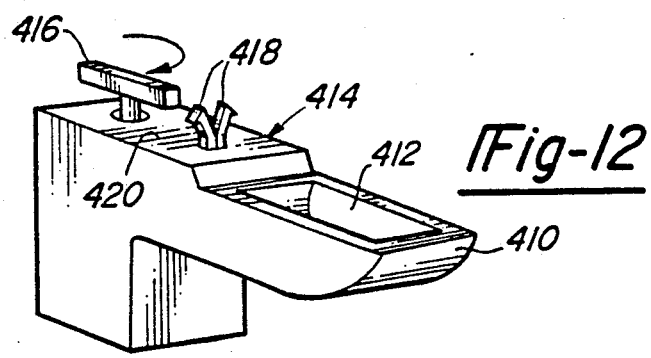
FIG. 12 is a perspective view of yet another embodiment of the invention.

FIG. 11 illustrates another embodiment of the invention in which the jack security device 130 has a modified protruding element 410 which is designed to substantially overlie the jack 110. Protruding element 410 has a hollowed out underportion 412, which provides sufficient clearance for the plug wire 210 and plug 220. The hollowed out protruding element 410 prevents the removal of plug 220 from jack 110 and also prevents the insertion of a plug or other foreign object into jack 110 by completely or substantially covering the jack opening. As illustrated, the jack security device 130 fits into panel wall 102 in a fashion comparable to the embodiment of FIG. 2A. Accordingly, like components in FIGS. 11 and 2A have ben given like reference numerals.

In the foregoing embodiments, the jack security device 130 has been adapted for insertion into a cut out portion or recess in the panel wall. The invention may also be practiced using a surface mounted jack security device and several examples of such surface mounted devices are depicted in FIGS. 12-26 and are described below.

Figure 13:
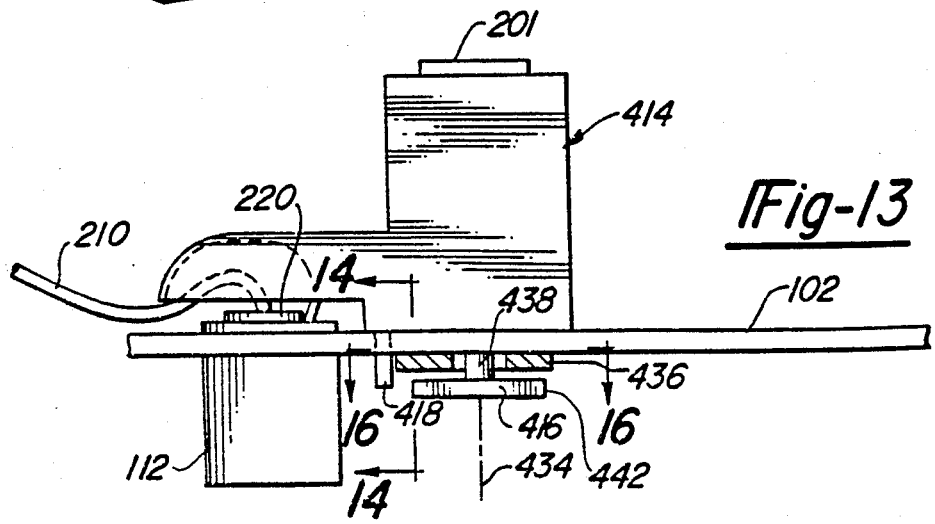
FIG. 13 is a cross-sectional view of the embodiment of FIG. 12, illustrating the jack security device in use.

Referring first to FIGS. 12-16, a first embodiment of surface mounted jack security device is illustrated. Specifically, the jack security device 414 is shown with underside facing up in FIG. 12. The security device includes a protruding element 410 with hollowed out underportion 412. The protruding element 410 is adapted to overlie the jack 110 so that it covers plug 220 and is adapted to accommodate plug wire 210, as illustrated in FIG. 13.

Jack security device 414 has a rotatable T-bar locking member 416 and a pair of spring loaded holding tabs 418 on the underside surface 420 of jack security device 414.

Figure 15:
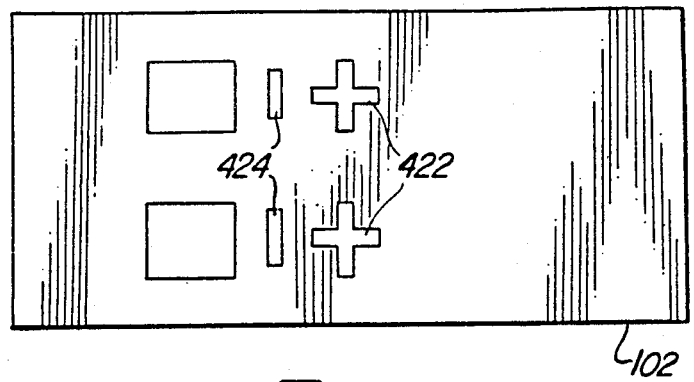
FIG. 15 is a plan view of the panel of the embodiment of FIG. 13.

Referring to FIGS. 13 and 15, panel 102 includes a plurality of star-shaped cut outs 422 and a corresponding plurality of slots 424, arranged as shown in FIG. 15. Star-shaped cut outs 422 receive the T-bar locking members 416 while slots 424 receive the spring loaded holding tabs 418. As shown in detail FIG. 14, the spring loaded holding tabs 418 are pivoted at rocker points 426 and are spring biased at 428. The holding tabs are arranged so that they will move inwardly against the spring bias tension when depressed into slot 424. Once fully depressed, the spring bias causes the holding tabs to spread apart to the position of rest shown in FIG. 14. The holding tabs each have an inclined frontal surface 430 which acts as an inclined plane to facilitate insertion into slot 424. The inclined undersurface 432 permits the holding tab from being pulled back out through slot 424 once inserted by overcoming the spring force of springs 428.

Figure 16:
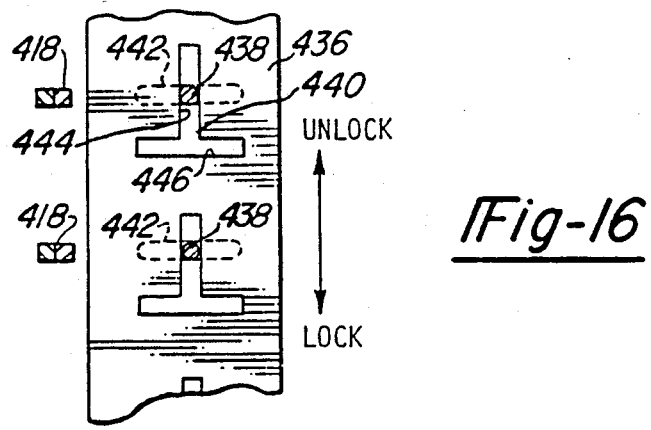
FIG. 16 is a detailed fragmentary view of the sliding locking bar of the embodiment of FIGS. 12 and 13, taken substantially along the line 16—16 in FIG. 13.
Figure 14:
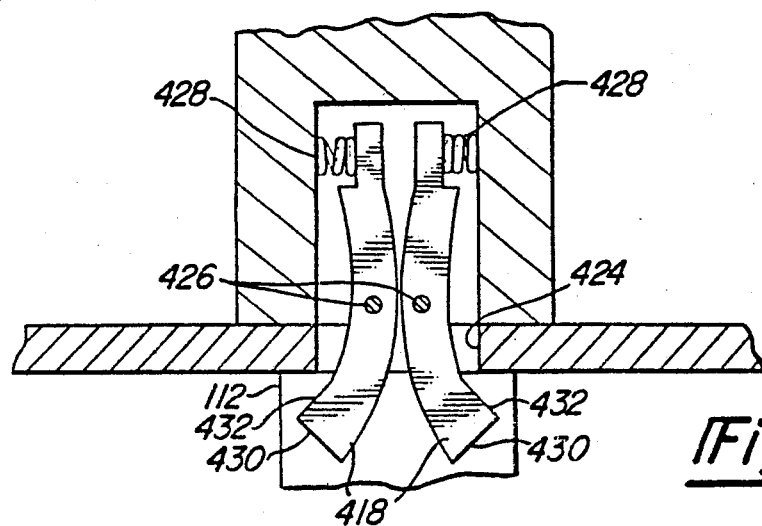
FIG. 14 is a detailed cross-sectional view of the spring loaded tabs taken substantially along the line 14—14 of FIG. 13.

T-bar locking member 416 may be rotated about its axis 434 by operation of a key or similar mechanism or operating tumbler 201. The T-bar locking member 416 extends through sliding locking bar 436, shown in FIGS. 13 and 16. Sliding locking bar 436 is accessible from the interior or underside of panel wall 102 and may be slid between locked and unlocked positions. The locked position is illustrated in FIG. 16 wherein the shaft 438 is positioned in the middle of the center leg 444 of a T-shaped cut out 440. The cross member 442 of T-bar locking member 416 is shown in dotted lines in FIG. 16. With the cross member 442 oriented at right angles to the center leg 444 of the cut out 440, the interaction between sliding locking bar 436 and T-bar locking member 416 prevents the jack security device from being removed from panel 102. When the T-bar locking member 416 is rotated 90 degrees so the cross member 442 is now parallel to center leg 444, the jack security device 414 may be lifted away from panel 102.

In order to override the effect of locking bar 436, the technician with access to the inside or underside of panel 102 can slide the locking bar 436 to the unlocked position at which cross member 442 is lined up with and parallel to cross leg 446 of cut out 440. In this configuration the jack security device 414 may be lifted away from panel 102 even when the T-bar locking member 416 is in the locked orientation.

Another embodiment of surface mounted jack security device is illustrated in FIGS. 17-20. The jack security device 448 of FIGS. 17-20 employs a combination lock 450 as an alternative to the key actuated tumbler illustrated in the previous embodiments. It will be recognized that the combination lock and key actuated locks may be substituted for one another in any of the embodiments illustrated herein. As illustrated, the jack security device 448 has a protruding element 410 which is adapted to overlie the plug 220 and jack 110 in a fashion similar to that illustrated in FIGS. 2A and 3, for example.

The jack security device 448 employs a modified split T-bar locking member 452 which is split down the middle as at 454 and capable of movement between the centrally retracted position shown in FIGS. 17 and 20 and the outwardly spread position shown in FIGS. 18 and 19. As shown in FIGS. 19 and 20, panel 102 is provided with a slot 456 into which T-bar locking member 452 may be inserted. Slot 456 is sized and member 452 is shaped with rounded edges on surfaces 458 and 459 so that T-bar locking member 452 slidingly snaps into place by depressing the locking member 452 into slot 456. The locking members are spring loaded so that they spread apart into the locked position of FIG. 19 once fully inserted. The locking members are connected to the combination lock 450 (or key actuated tumbler) so that operation of the proper combination (or turning the key) causes the locking ember 452 to move to the inwardly retracted position of FIG. 20 for removal.

The jack security device 448 may be overridden by the technician who has access to the underside or inside of panel 102. The locking mechanism is overridden by pinching the T-bar locking member 452 to its inwardly retracted position by manually grasping surfaces 458 and 459 and urging the locking member into the closed or retracted position of FIG. 20. Thereafter, the entire jack security device 448 may be lifted away from panel 102.

Figure 21:
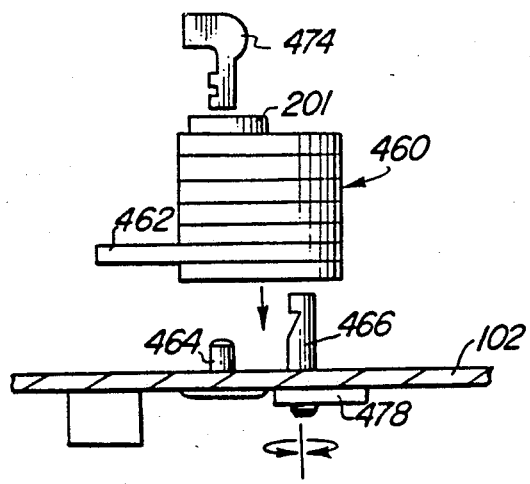
FIG. 21 is a cross-sectional view of still another embodiment of the invention with locking mechanism shown in elevation.
Figure 23:
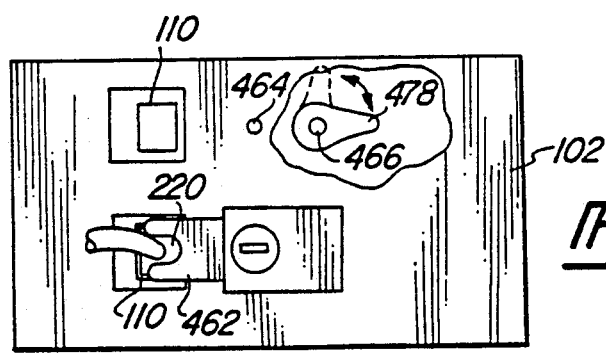
FIG. 23 is a plan view of the embodiment of FIG. 21, with a portion of panel cut away to illustrate the override feature.

Yet another embodiment of surface mounted jack security device is illustrated in FIGS. 21–24. Referring to FIG. 21, jack security device 460 comprises a laminated padlock wherein one of the laminations 462 forms an outwardly protruding element which is configured as shown in FIG. 23 to cover jack 110 to prevent plug 220 from being removed. Protruding lamination 462 also prevents a plug from being inserted into the jack.

Figure 25:
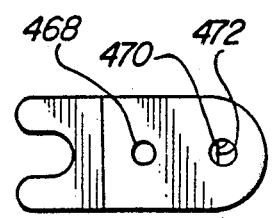
FIG. 25 is an underside view of the locking mechanism of FIG. 21.
Figure 22:
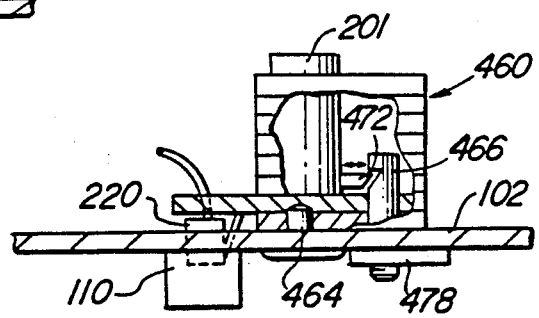
FIG. 22 is a cut away cross-sectional view illustrating the internal locking mechanism of the embodiment of FIG. 21.

As seen in FIG. 21, panel 102 is provided with alignment post 464 and notched locking post 466. The alignment post and locking post are aligned with the corresponding jack 110, as seen in FIG. 23. Jack security device is provided with a pair of apertures on the underside surface as shown in FIG. 25. The firs aperture 468 is sized to matingly receive post 464, while the second aperture 470 is sized to receive locking post 466. As shown diagrammatically in FIG. 22, the jack security device houses an internal tumbler mechanism 201 which has a spring loaded catch 472 adapted to mate with notched locking post 466. The tumbler mechanism is constructed so the catch is spring biased toward the radially outward position and may be moved radially inwardly by either rotating the key 474 in the lock or by depressing inwardly on catch 472.

Figure 26A:
FIGS. 26A and 26B illustrate the operation of the override feature of the embodiment of FIG. 17 and 18 in greater detail.
Figure 26B:
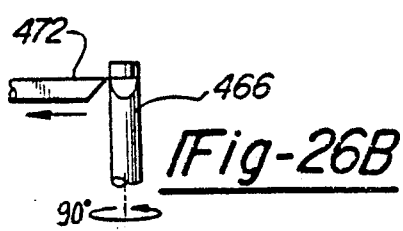

Locking post 466 is journaled for rotation about its axis and includes a lever 478 which is disposed on the underside of panel 102. Lever 478 may be actuated by the technician having access to the underside of panel 102 in order to rotate locking post 466. By rotating locking post 466 to the position shown in dotted lines in FIG. 23, the notched portion of the locking post is rotated out of engagement with catch 472. See detail in FIGS. 26A and 26B. Upon such rotation, catch 472 is forced radially inwardly by the camming action of locking post 466 (FIG. 26B). In the radially inward position, catch 472 rests on the cylindrical surface of locking post 466 to permit sliding between the catch and locking post in order to allow the jack security device 460 to be lifted upwardly and removed from panel 102.

Figure 24:
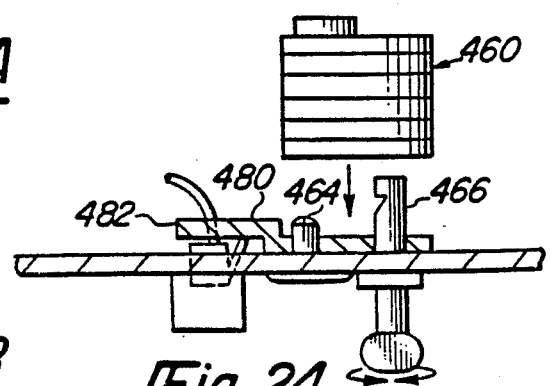
FIG. 24 is an alternate embodiment of jack security device.
Figure 30:
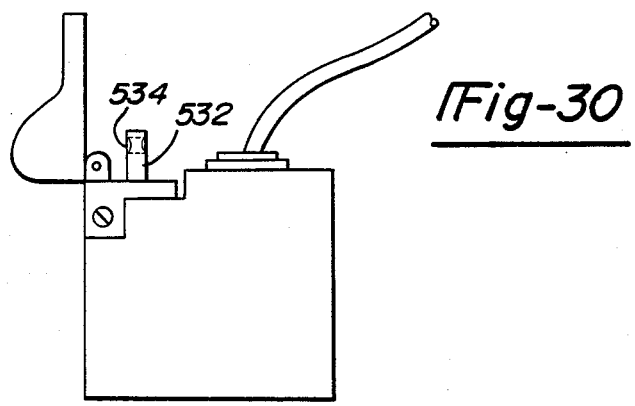
FIG. 30 is a similar side view, with padlock removed and with keeper lifted to permit access to the jack and lock.

An alternate embodiment employing this principal is illustrated in FIG. 24, wherein the jack security device 460 does not have a protruding lamination. Instead, a separate locking plate 480 is provided, locking plate 480 fits over alignment post 464 and locking post 466 and has a raised tongue portion 482 which is configured to overlie the jack 110 similar to the protruding lamination 462 of FIG. 23. Engagement of jack security device 460 onto alignment post 464 and locking post 466 holds the locking plate 480 in place to prevent plug 220 from being removed from jack 110 and which similarly prevents a plug from being inserted into jack 110 if not already present.

The various approaches contemplated by the invention for providing override of a locked condition of the security device may be effected automatically upon opening of the rear door 104 of cabinet 100 or only upon manual intervention by the accessing technician. The devices 112 can be manufactured as separate units for each jack position or alternatively could come in modular arrays for a plurality of such jacks. The devices 112 and associated keys may be manufactured from metal or plastic, depending upon strength requirements and cost constraints.

In still another embodiment of the invention, conventional padlocks are used to lock individual jacks. The alternate embodiment, illustrated in FIGS. 28–32, may be used in conjunction with previously described cabinets or in conjunction with a presently preferred cabinet illustrated in FIG. 27.

Referring to FIG. 27, cabinet 510 comprises a telephone company side 512 and a customer side 514. In FIG. 27 the customer cover 516 is shown open to reveal a plurality of modular jack chassis 518. The chassis support a plurality of modular jacks 520 in a high density, closely-spaced configuration. The jack security device is shown diagrammatically at 522.

Referring to FIG. 28, jack security device comprises a locking bar 524 to which a plurality of plug keepers 526 are pivotally secured. As seen in FIG. 29, locking bar 524 is pivotally attached for swinging movement about pivot point 528 relative to the stationary jack field 530. Secured at a plurality of spaced locations along the locking bar are locking posts 532, posts 532 have a transverse bore 534 (as shown in dotted lines in FIG. 30) through which the shackle 536 of padlock 538 may pass.

With the plug keeper in the locked position (shown in FIG. 29) and with padlock 538 installed, the keeper prevents change of the lock and jack configuration, i.e., it prevents a plug from being removed from a jack and it prevents a plug from being inserted into a jack covered by the keeper. In this fashion individual customers can lock individual plug and jack combinations, to prevent tampering.

In order to override the locking mechanism the entire locking bar assembly carrying all keepers and individual padlocks can be pivoted about pivot point 528 to an open position in which all keepers are disposed in the open position whereby all plugs and jacks are accessible for change.

Figure 31:
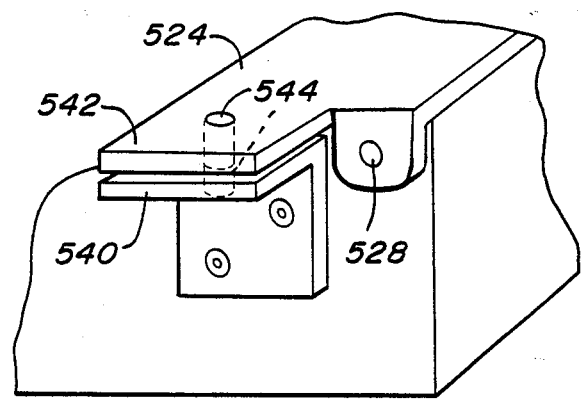
FIG. 31 is a first embodiment of restriction device for selectively preventing overriding of the padlocks.
Figure 32:
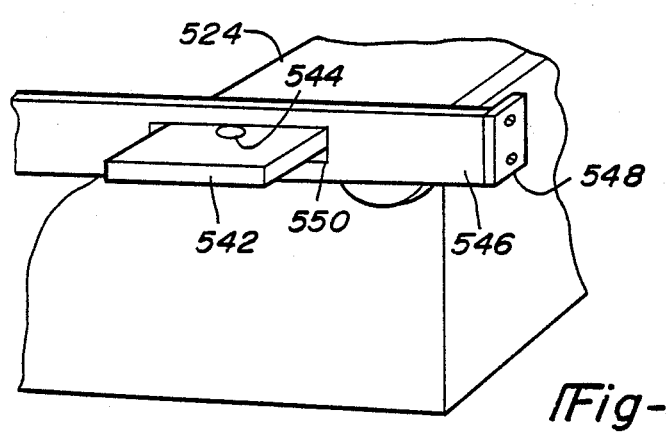
FIG. 32 is another embodiment of restriction means for selectively preventing the overriding of the padlocks.

Two alternative means for restricting or inhibiting the movement of locking bar 524 to the open position are shown in FIGS. 31 and 32. In the embodiment of FIG. 31 a bracket 540 is positioned beneath the outwardly extending ear 542 of the locking bar. A padlock or the like may be inserted through coaxially aligned apertures 544 whereby the locking bar may be locked to the bracket to prevent pivotal movement about pivot point 528.

In the alternate embodiment of FIG. 32 a hasp 546 is hingedly secured as at 548 to the cabinet structure and includes an elongated slot 550 through which ear 542 protrudes when the hasp is in the locking position shown. A padlock or the like can be inserted through aperture 544 to prevent hasp 546 from being hingedly pivoted to the open position whereby ear 542 is no longer engaged through slot 550 to permit the locking bar to be pivoted to the open position.

In the presently preferred embodiment the plug keepers are provided with upwardly extending flanges 552 (FIGS. 28 and 29) which capture the sides of padlock 538 to prevent the padlock from interfering with adjacent keepers. In addition, the locking post 532 is preferably of a sufficiently large diameter relative to the radius of curvature of padlock shackle 536 so that the padlock cannot be pivoted upwardly by feeding successive portions of the shackle through bore 534. This prevents the padlocks from being rotated into a position where they interfere with the plugs and jacks or wiring, or with the proper closing of cover 516. Furthermore, the diameter of locking post 532 is preferably of sufficient dimension relative to the radius of curvature of the shackle to prevent the padlock from being installed other than in the side facing position shown in FIG. 29.

Preferably the locking bar is fabricated from metal or a sturdy plastic. Plug keepers may likewise be fabricated from metal or a sturdy plastic. If desired, the locking bar can be in the form of a piano hinge wherein the piano hinge itself serves as the pivot point 528. Other configurations for accommodating conventional padlocks are also possible.

The invention has ben disclosed with reference to a detailed description of exemplary embodiments. Such details are presented for the sake of example only and are not intended as limitations to the scope and spirit of the invention defined in the appended claims.

What is claimed is:

1. In an electrical plug and jack distribution system in which at least one plug having signal conductor attached thereto and at least one jack cooperate to selectively assume mated and unmated relationships, a security device comprising:
    a panel for supporting said jack;
    a mounting means movably secured to said panel for movement between a first position and a second position;
    a means for selectively locking said mounting means in said first position;
    a keeper means attached to said mounting means for movement between a jack engaging position and a jack exposing position and means for locking said keeper means in said jack engaging position;
    said keeper means, in said jack engaging position, at least partially overlying said jack for preventing change in the mated and unmated relationship of said plug and jack;
    said keeper means having an aperture which defines an open contour for partially encircling said signal conductor to allow said signal conductor to pass beyond the plane of said keeper mans when said keeper means is in said jack engaging position;
    said keeper means, in said jack exposing position, permitting change in the mated and unmated relationship of said plug and jack;
    said mounting means, in said second position, permitting change in the mated and unmated relationship of said plug and jack notwithstanding the position of said keeper means;
    wherein said open contour permits said keeper means to move between said jack exposing and jack exposing positions without removing said signal conductor when said pug and jack are in the mated relationship.

2. The system of claim 1 wherein said mounting means is hingedly connected to said panel.

3. The system of claim 1 wherein said means for locking said keeper means comprises means for receiving a padlock.

4. The system of claim 1 wherein said means for locking said keeper means comprises post means on said mounting means and orifice means on said keeper, said orifice means receiving said post means when said keeper is in said jack engaging position.

5. The system of claim 4 wherein said post is adapted to receive a padlock for preventing said keeper from moving from said jack engaging position.

6. The system of claim 1 wherein said means for selectively locking said mounting comprises means for connecting said mounting means to said panel such that said mounting means is confined to said first position.

7. The system of claim 6 wherein said connecting means includes means for receiving a padlock.

8. In an electrical plug and jack distribution system in which at least one plug and at least one jack cooperate to selectively assume mated and unmated relationships, a security device comprising:
    a panel for supporting said jack;
    mounting means movably secured to said panel;
    means for selectively locking said mounting means in place;
    keeper means associated with said panel for movement between a jack engaging position and a jack exposing position to enable individual access to at least one plug and jack;
    said keeper means, in said jack engaging position, at least partially overlying said jack for preventing change in the mated and unmated relationship of said plug and jack;
    said keeper means, in said jack exposing position, permitting change in the mated and unmated relationship of said plug and jack;
    means for receipt of a shackle of a padlock to retain said keeper in said jack engaging position;
    said mounting means movable in an unlocked condition to enable change in the mated and unmated relationship of all plugs and jacks in said electrical plug and jack distribution system notwithstanding the position of said keeper means with respect to said mounting means;
    wherein said means for attaching a padlock is so constructed and arranged to retain the body of said padlock in a substantially confined position relative to said keeper.

9. The system of claim 8 wherein said keeper defines a longitudinal dimension and wherein said shackle defines a plane and wherein said means for attaching a padlock retains the body of said padlock so that said plane of said shackle is oriented generally parallel to said longitudinal dimension.

10. The system of claim 8 wherein said keeper includes at least one upstanding flange for retaining the body of said padlock.

* * * * *

UNITED STATES PATENT AND TRADEMARK OFFICE
CERTIFICATE OF CORRECTION

PATENT NO. : 4,911,646

DATED : March 27, 1990

INVENTOR(S) : Albert U. Marson et al

It is certified that error appears in the above-identified patent and that said Letters Patent is hereby corrected as shown below:

```
Column 5, Line 13
"440" should be --240--.

Column 6, Line 31
"provide" should be --provided--.

Column 6, Line 48
"707m" should be --707-m--.

Column 7, Line 38
"ben" should be --been--.

Column 8, Line 64
"ember" should be --member--.

Column 9, Line 20
"firs" should be --first--.

Column 11, Line 12
"ben" should be --been--.
```

UNITED STATES PATENT AND TRADEMARK OFFICE
CERTIFICATE OF CORRECTION

PATENT NO. : 4,911,646

DATED : March 27, 1990

INVENTOR(S) : Albert U. Marson, et al

It is certified that error appears in the above-identified patent and that said Letters Patent is hereby corrected as shown below:

Column 11, Line 55, Line 55, "pug" should be --plug--.

Column 12, Line 13, after "mounting" insert --means--.

Signed and Sealed this

Seventeenth Day of September, 1991

*Attest:*

HARRY F. MANBECK, JR.

*Attesting Officer*     *Commissioner of Patents and Trademarks*